June 28, 1960  I. W. DOYLE ET AL  2,943,209
EXPOSURE-CONTROL APPARATUS
Filed Aug. 10, 1953  3 Sheets-Sheet 1

June 28, 1960    I. W. DOYLE ET AL    2,943,209
EXPOSURE-CONTROL APPARATUS

Filed Aug. 10, 1953      3 Sheets-Sheet 3

United States Patent Office 2,943,209
Patented June 28, 1960

2,943,209
EXPOSURE-CONTROL APPARATUS

Irving W. Doyle, Massapequa, N.Y., and Warner A. Eliot, New Canaan, Conn., assignors to Fairchild Camera and Instrument Corporation, a corporation of Delaware Filed Aug. 10, 1953, Ser. No. 373,272

17 Claims. (Cl. 250—220)

This invention relates to exposure-control apparatus and, while it is of general application, it is particularly suitable for controlling the exposure of an aerial camera.

In aerial photograhy, particularly military photography where the camera is usually positioned in a portion of the plane inaccessible to the photographer, it is desirable to provide a system for automatically controlling the exposure of the camera in accordance with the brightness of the scene being photographed in order to obtain optimum exposure for all scenes and maximum detail in the developed films.

There have heretofore been proposed automatic exposure-control systems for aerial cameras comprising as the light sensing apparatus an auxiliary optical system and photoelectric pick-up device and a mechanism responsive to the sensing apparatus to set the shutter speed and diaphragm opening of the camera. Such a system responds to the average or integrated illumination of the entire scene being photographed and is satisfactory for many scenes, particularly those in which the illumination over the whole scene does not differ considerably from the average illumination. However, in the case of scenes having a small area of relatively dark detail, the rest of the scene being brightly illuminated, the exposure-control system of the type described will effect a decided under-exposure of the film so that the detail in the small dark area will be lost. On the other hand, in the case of a scene comprising a relatively small area of bright detail, the rest of the scene being dark, the exposure-control apparatus described results in a decided over-exposure so that the detail in the small bright area is lost. An example of the first type of scene often encountered in military operations is a winter-time scene with snow covering most of the ground. An example of the second type of scene is that comprising large generally flat areas of low reflectance, but including a small area of bright detail.

The present invention is directed to the problem of overcoming the deficiencies of the automatic exposure-control apparatus described and involves the determination of the illumination of the darkest elemental area of the scene or the illumination of the brightest elemental area of the scene, or both, and the control of the camera expsure so that the darkest portion of the scene exposes the film only slightly above the density of the fog level, while the brightest part of the scene exposes the film near but somewhat below the point of complete reduction of the photosensitive medium of the film.

It is an object of the present invention, therefore, to provide a new and improved automatic exposure-control apparatus which avoids one or more of the above-mentioned limitations of prior automatic exposure-control apparatus.

It is another object of the invention to provide a new and improved exposure-control apparatus effective to control the exposure of a film in accordance with the illumination of the brightest elemental area of the scene or the darkest elemental area of the scene, or both. It is a further object of the invention to provide a new and improved exposure-control apparatus effective to expose the film to a density only slightly above the fog level of the film for the darkest elemental area of the scene and to expose the film to a point near but somewhat below complete reduction of the photosensitive medium for the brightest elemental area of the scene.

In accordance with the invention, there is provided an exposure-control apparatus responsive to an extreme illumination value of a scene comprising a continuously operable scanning device for repetitively examining elemental areas of the scene in a predetermined regular sequence, means disposed in the optical path of the scaning device for developing an electrical signal varying with the illumination of the elemental area of the scene under examination by the scanning device, an electrical detector selectively responsive to an extreme value of the developed signal over a scanning period and for storing such extreme value of the signal for a predetermined period, and an output circuit responsive to such stored signal. The term "exposure" as used herein and in the appended claims refers to the product of the exposure time and the aperture opening of the camera, which factor determines the degree of reduction of the photosensitive medium. The term "electrical detector" is used herein and in the appended claims in its usual sense in the electronics art to refer to a device for deriving from a fluctuating electrical signal a predetermined characteristic of its fluctuations, for example, its peak amplitude.

For a better understanding of the present invention, together with other and further objects thereof, reference is had to the following description taken in connection with the accompanying drawings, while its scope will be pointed out in the appended claims.

Referring now to the drawings:

Fig. 5 is a circuit diagram, partly schematic, of a modified form of exposure-control apparatus responsive to the illuminations of both the brightest and darkest portions of the scene being photographed; while

Figure 1:
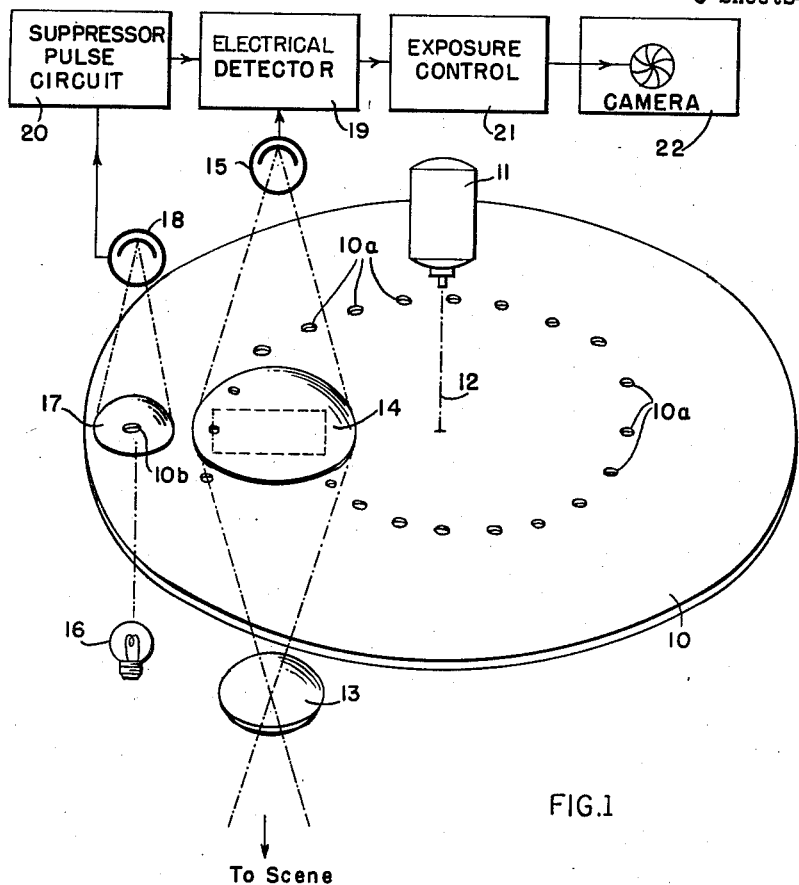
Fig. 1 is a schematic representation of an exposure-control apparatus embodying the invention.

Referring now to Fig. 1 of the drawings, there is represented an exposure-control apparatus embodying the invention and responsive to an extreme illumination value of a scene being photographed. This apparatus includes a scanning device for examining elemental areas of the scene in sequence, which device may be in the form of a Nipkow disc 10 including a series of scanning holes 10a and an auxiliary pulse-developing hole 10b for a purpose described hereinafter. The disc 10 is connected to be driven by a motor 11 and a shaft represented schematically at 12. The apparatus also includes means for developing an electrical signal varying continuously with the illumination of the elemental area of the scene under examination by the scanning device. This means includes an optical system associated with the disc 10 and including a lens 13 for imaging the scene to be photographed on a portion of the disc 10 including the scanning holes 10a during rotation of the disc, a condensing lens 14, and a photoelectric device such as a photocell 15 on which the light from the several elemental areas of the scene scanned by the disc 10 is directed in succession by the lens 14.

The exposure-control apparatus also includes means for operating synchronously with the scanning device 10 for periodically developing pairs of closely spaced electrical suppressor pulses. This means includes a source of illumination, such as a lamp 16, illuminating the hole 10b of the disc 10 and a condenser lens 17 for focusing the image of the hole 10b on a second photoelectric device or photocell 18. The output of the photocell 15 is impressed upon an electrical detector unit 19, while the output of the photocell 18 is impressed upon a suppressor pulse circuit 20, the output of which is applied to the detector unit 19 to control the same. The output of the detector unit 19 is applied to an exposure-control unit 21, that is, a unit for controlling the exposure time and diaphragm opening of a camera 22. The exposure control unit 21 may be any suitable type of servo mechanism responsive to the unidirectional signal output of the detector unit 19 for adjusting the timer and the diaphragm aperture of the camera 22 in any conventional manner. One mechanism suitable for use as the exposure-control unit 21 is described and claimed in the copending application of Irving W. Doyle, Serial No. 373,258, filed concurrently herewith, and assigned to the same assignee as the present application.

Figure 2:
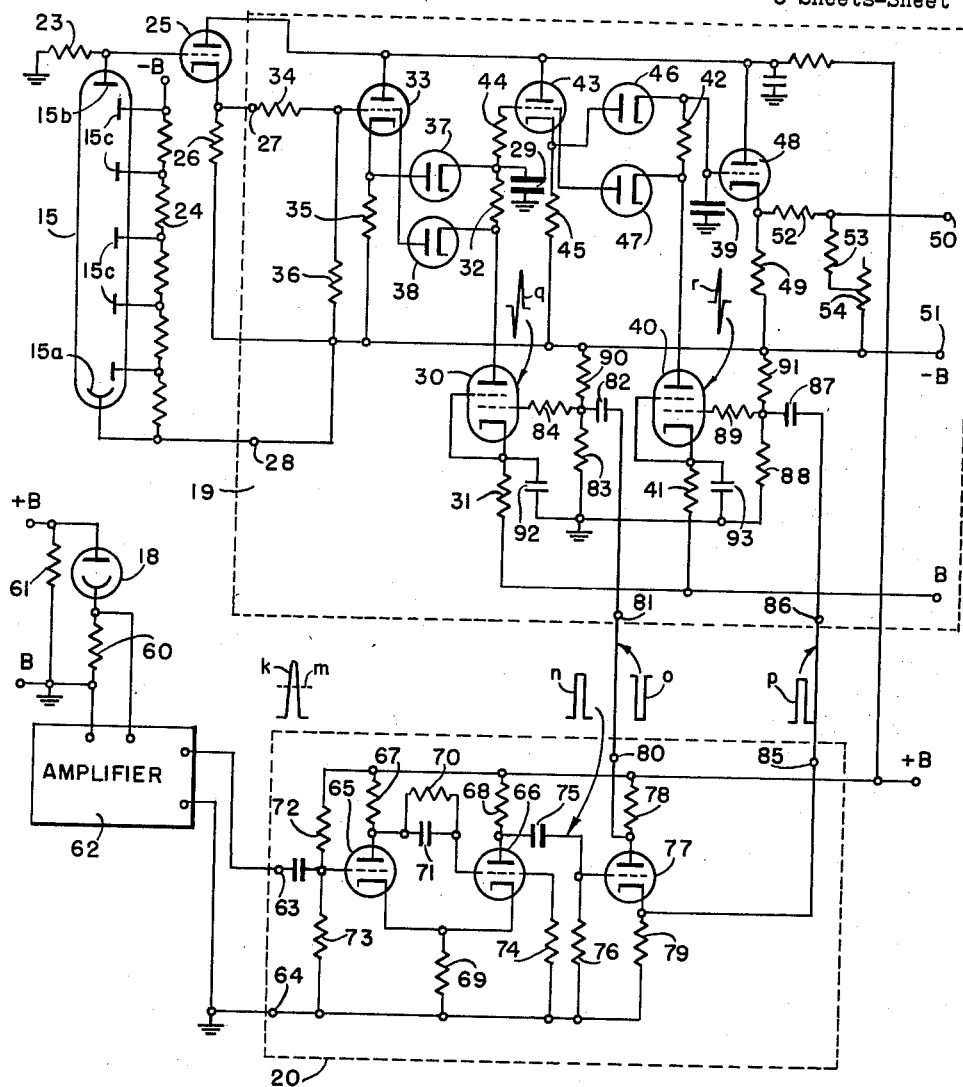
Fig. 2 is a circuit diagram, partly schematic, of the electrical control system of the apparatus of Fig. 1.

The electrical control system of the exposure-control apparatus of Fig. 1, comprising the units 19 and 20, is represented in Fig. 2 of the drawings. Referring to Fig. 2, the photocell 15 is represented as being of the photomultiplier type, such as type C-7151A, having a cathode 15a connected to the negative terminal of a source of potential +B, —B, an anode 15b connected to an intermediate point of the source +B, —B such as ground, through a load resistor 23, and a series of multiplier electrodes 15c connected to electrically spaced points of a resistance voltage divider 24 connected between the terminal —B and a point of higher intermediate potential B. The output of the unit 15 appearing across load resistor 23 is applied to the control electrode of a vacuum-tube amplifier 25 provided with a cathode load resistor 26 and thus comprising a cathode-follower type of amplifier circuit.

The electrical control system of Fig. 2 includes an electrical detector, such as the unit 19, responsive to the signal developed by the scanning device described for detecting an extreme value thereof over a scanning period, that is, a value corresponding to the maximum or minimum elemental illumination of the scene, and for storing this extreme value of the signal for a predetermined period. This signal, appearing across the resistor 26, is applied to input terminals 27, 28 of the unit 19. The electrical detector 19 comprises a signal-storage device, such as a condenser 29, and a circuit for charging the condenser to a reference-signal value, this circuit including a gaseous discharge device, such as a thyratron 30, connected to charge the condenser 29 from the source B through serially connected resistors 31 and 32. The electrical detector 19 also comprises a circuit including a directionally conductive device for applying the signal developed by the scanning device to the condenser 29 to discharge the same to the minimum signal occurring during a scanning cycle. This latter circuit includes a vacuum-tube amplifier 33 to the control electrode of which the signal at the terminals 27, 28 is applied through a resistor 34, the tube 33 being provided with a cathode load resistor 35 to form a cathode-follower amplifier. The control electrode of tube 33 is provided with a conventional grid leak 36. The signal developed across the load resistor 35 is applied to the condenser 29 to discharge the same through a directionally conductive device or diode 37. A diode 38 is also connected between the low potential terminal of resistor 32 and the control electrode of tube 33 for a purpose described hereinafter.

The electrical detector 19 also includes a second signal-storage device or condenser 39 and a circuit for charging this signal-storage device to substantially the same reference-signal value as the condenser 29. This charging circuit includes a gaseous discharge device, such as a thyratron 40, connected to charge the condenser 39 from the source B through serially connected resistors 41 and 42. There is also provided means for transferring the minimum value of the signal developed across condenser 29 to the second signal-storage device or condenser 39. This latter means comprises a circuit including a vacuum-tube amplifier 43, to the control electrode of which the signal appearing on the condenser 29 is applied through a resistor 44. The tube 43 is provided with a cathode load resistor 45 to form a cathode-follower amplifier, while the signal developed across the resistor 45 is applied to the condenser 39 to discharge the same through a directionally conductive device or diode 46. The low potential terminal of resistor 42 is connected to the control electrode of the tube 43 through a diode 47 for purposes hereinafter described.

The signal developed across condenser 39 is applied to the control electrode of a vacuum-tube amplifier 48 which is provided with a cathode load resistor 49 to form a cathode-follower amplifier. The signal developed across the load resistor 49 is the amplified transferred signal appearing across condenser 39 and is thus indirectly responsive to the stored signal on condenser 29. This signal is applied to the output terminals 50, 51 through an attenuator network comprising a series resistor 52 and a shunt resistance arm consisting of a fixed resistor 53 and an adjustable resistor 54 in series. It will be understood that the output signal developed at the terminals 50, 51 is that applied to the camera shutter control unit 21 of Fig. 1 for controlling the exposure of the camera.

The electrical control system of the apparatus also includes means for utilizing the periodic electrical pulses developed by the elements 16, 17, 18 for developing periodic pairs of pulses, periodically to suppress the transferred signal appearing at the condenser 39 and thereafter suppressing the stored signal appearing at condenser 29. As shown in Fig. 2, the photocell 18 responsive to the image of the auxiliary pulse generating hole 10b of the scanning disc 10 is provided with a load resistor 60 and is connected to a suitable source B, +B and provided with a shunt resistor 61. The periodic pulse signal appearing across the load resistor 60 is applied to an amplifier unit 62 of any conventional form, the output signal of which is applied to the terminals 63, 64 of the suppressor pulse circuit 20.

The unit 20 includes a bi-stable multivibrator comprising a first vacuum tube 65 and a second vacuum tube 66 energized from a source +B through load resistors 67 and 68, respectively, and having a common cathode load resistor 69. The anode of the tube 65 is connected to the control electrode of the tube 66 by a time-constant circuit comprising a resistor 70 and a condenser 71 in parallel. The control electrode of the tube 65 is biased to render the tube non-conductive by means of a voltage divider comprising resistors 72 and 73 connected across the source +B. The control electrode of tube 66 is biased by a voltage-divider combination consisting of resistors 67, 70, and 74 connected in series between +B and ground. This bias is adjusted so that the tube 66 is normally conductive.

The output signal developed by the multivibrator comprising tubes 65 and 66 is applied through a coupling condenser 75 and a resistor 76 to the control electrode of a phase-splitting amplifier 77 having an anode load resistor 78 and a cathode load resistor 79 of equal values. The signal appearing across the load resistor 78 is applied to the output terminal 80 of unit 20 and thence to an input terminal 81 of unit 19 from which the signal is applied to a differentiating circuit comprising a condenser 82 and a resistor 83 connected in series. The differentiated signal appearing across the resistor 83 is applied to the control electrode of thyratron 30 through a resistor 84. Similarly, the signal appearing across load resistor 79 of amplifier 77 is applied via output terminal 85 of unit 20 and input terminal 86 of unit 19 to a differentiating circuit comprising a condenser 87 and a resistor 88 connected in series. The differentiated signal appearing across resistor 88 is applied to the control electrode of thyratron 40 through a resistor 89. Bias potentials are applied to control electrodes of the thyratrons 30 and 40 to maintain the same normally non-conductive by means of voltage dividers 83, 90 and 88, 91, respectively, connected across the source —B. Cathode by-pass condensers 92 and 93 are provided for the thyratrons 30 and 40, respectively. The amplifier tubes 25, 33, 43, 48, 65, 66, and 77 are supplied with space current by connections to suitable points of the potential source —B—+B, as shown.

Coming now to the operation of the above-described apparatus, it will be assumed that the optical system of the scanning device of Fig. 1 is focused upon a scene being photographed and that the disc 10 is rotating at a suitable speed, for example, 3600 r.p.m. This scanning device and its associated photocell 15, as well understood in the art, then analyse or dissect the image scene and develop an electrical signal varying continuously with the illumination of the elemental areas of the scene. This signal is developed across the load resistor 23 of photocell 15, is amplified by the tube 25, and an amplified signal of the same polarity is developed across resistor 26 and applied to the input terminals 27, 28 of the electrical detector 19. It will be assumed that initially the signals stored on the condensers 29 and 39 have been suppressed and that these condensers have been recharged approximately to the potential B through their respective thyratrons 30, 40, which are self-extinguishing when their respective condensers are fully charged.

Figure 4:
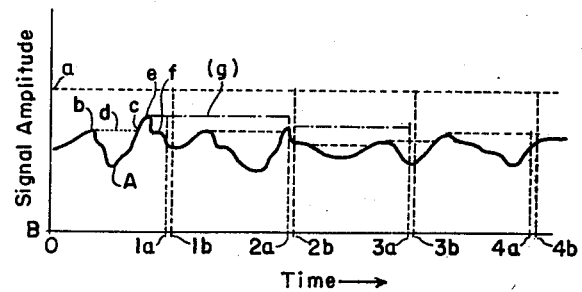
Fig. 4 is a graph representing the storage characteristics of the electrical detectors of the control system of Fig. 2 to aid in explaining the invention.

Under these conditions the average signal across the resistor 23 is negative and the polarity of its fluctuating component is such that it has a minimum negative value (most positive value) when the illumination of the elemental area being scanned is a minimum. The average signals across resistors 26 and 35 are more positive than the potential B to which condensers 29 and 39 are charged and the polarity of the fluctuating components of these signals is the same as that across resistor 23. The signal across the resistor 35 is illustrated in Fig. 4 which represents approximately four scanning cycles. In this figure the ordinate $a$ represents the value of the signal for zero light, while the abscissa axis represents the potential B. Curve A represents the signal developed across the resistor 35. As this signal becomes more positive with decrease in the elemental area illumination of the scene being scanned, it tends to discharge the condenser 29 through the diode 37 up to the point $b$. Subsequent decreases in this signal value with increases in elemental area illumination, however, do not again charge the condenser 29 negatively due to the directional conductivity of the diode 37. Therefore, the minimum negative or maximum positive potential across the condenser 29 is stored or retained up to the point $c$, as represented by the dotted line $d$. From the point $c$ to the point $e$ the condenser 29 is further discharged and, since this represents the maximum value of the signal during the first cycle, this value is stored on the condenser 29 for the remainder of the first scanning cycle, as represented by the dotted line $f$.

The maximum positive signal appearing on the condenser 29 is applied or transferred through the amplifier 43 and the diode 46 to the energy-storage condenser 39, which follows the potential of the condenser 29 continuously. At the time $1a$, shortly before the end of the first scanning cycle, the signal on condenser 39 is momentarily suppressed by the energizing of its charging circuit including thyratron 40 to recharge the condenser to the reference signal level B. Immediately after the suppression of the signal on the condenser 39, the signal then stored on the condenser 29 is again transferred to the condenser 39, as described above, and this condenser stores the transferred signal for the succeeding scanning cycle, as represented by the dot-dash line $g$ of Fig. 4.

Shortly after the suppression of the signal on the condenser 39 and its recharge to the potential of condenser 29 and at approximately the end of the first scanning cycle, the energizing circuit for the condenser 29 is completed through the thyratron 30 momentarily to suppress the signal thereon, that is, to recharge it substantially to the reference signal value B. This takes place at the time $1b$ of Fig. 4 and thereafter the signal developed across the resistor 35 again is effective to discharge the condenser 29, which stores the maximum positive values or minimum negative values of the signal for succeeding scanning cycles in the same manner. Near the conclusion of each scanning cycle, the transferred signal on the condenser 39 is first momentarily suppressed at the times $1a$, $2a$, $3a$, etc., and the condenser is recharged to the potential of condenser 29 and shortly thereafter the signal stored on the condenser 29 is suppressed to condition it to store the maximum positive values of the signals in the succeeding cycle. Thus the signal across condenser 39 during each scanning cycle represents the maximum positive or minimum negative signal developed by the photocell during the preceding cycle, that is, the minimum brightness of the scene during such cycle, unless the brightness reaches a still lower minimum value during the given scanning cycle, whereupon the signal across condenser 39 assumes a potential corresponding to such lower minimum brightness for the balance of that scanning cycle.

The signal across condenser 39 is amplified by tube 48 and applied to the output terminals 50, 51 by way of adjustable attenuator 52, 53, 54. The output signal appearing at terminals 50, 51 is applied to the camera shutter control unit 21 for continuously controlling the exposure of the camera in any well known manner, for example, as described in aforesaid copending application, Serial No. 373,258.

Coming now to the suppressor pulse circuit for developing the periodic pairs of pulses for triggering the thyratrons 30 and 40 as described, it will be clear that the lamp 16, lens 17, and photocell 18 co-operate with the scanning hole $10b$ of the scanning disc 10 to develop a single potential pulse across the load resistor 60 (Fig. 2) for each rotation of the disc 10. This pulse signal is amplified in the unit 62 and applied to the terminals 63, 64 of the suppressor pulse circuit 20, which terminals comprise the input circuit of a bi-stable multivibrator including a pair of vacuum tubes 65 and 66. As stated above, the biases on the tubes 65 and 66 are so selected that the tube 66 is normally conductive and the tube 65 is non-conductive. The pulse signal applied to the input of the tube 65 is represented above the circuit by the curve $k$. When the magnitude of the leading edge of this pulse exceeds the level $m$, representing the bias on the tube 65 above which conduction takes place, this tube becomes conductive and in so doing feeds a pulse through the time-constant circuit 70, 71 to the tube 66 to render it non-conductive. At the point of the curve $k$ at which its trailing edge falls below the level $m$, the tube 65 again becomes non-conductive with the result that a pulse is applied through the circuit 70, 71 to render the tube 66 again conductive.

The result of this cycle of operation of the multivibrator is to develop a narrow rectangular positive pulse $n$ across the load resistor 68 of tube 66. This pulse is applied to the phase-splitting tube 77 which is effective to develop across its anode load resistor 78 and cathode load resistor 79 similar narrow rectangular potential pulses of opposite polarities which are applied to the terminals 80 and 85, respectively, and are represented by the curves $o$, $p$, respectively. The negative pulse represented by curve $o$ is applied to the differentiating circuit comprising condenser 82 and resistor 83 in the input circuit of the thyratron 30, resulting in the generation of a double-impulse signal *q* applied to the grid of the thyratron 30, the positive spike of this pulse occurring approximately at the trailing edge of the pulse *o*. Simultaneously the signal represented by curve *p* is applied to the differentiating network comprising condenser 87 and resistor 88 so that there is developed across the latter a double-impulse signal *r* which is applied to the grid of the thyratron 40. Because of the opposite polarity of the signal pulse *p*, the positive spike of the signal of curve *r* occurs at the leading edge of the pulse *p*. Thus, the positive spikes of the signals represented by signals *q* and *r* are separated in time by the duration of the pulses *n*, *o*, and *p*. Thus, the positive spike of pulse *r* is effective initially to trigger the thyratron 40 to suppress the signal on the condenser 39, as described above, and shortly thereafter the positive spike of the pulse *q* is effective to suppress the stored signal on the condenser 29.

In order to prevent feedback of the negative signal applied to the condensers 29 and 39 during their resetting or suppression of the signals thereon, the negative potentials at the lower terminals of the resistors 32 and 42 are applied to the control electrodes of the amplifiers 33 and 43, respectively, through the diodes 38 and 47, respectively, to render the tubes 33 and 43 non-conductive during the recharging intervals of the storage condensers.

Figure 3:
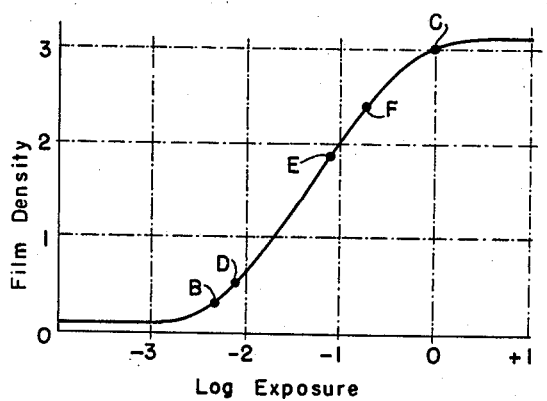
Fig. 3 is a graph of the response characteristic of a typical photosensitive medium.

Referring now to Fig. 3, there is represented the response characteristic of a typical photosensitive medium which, it is noted, is approximately linear between the points B and C. The curve of Fig. 3 is plotted in terms of the logarithm of the exposure, the exposure varying as the product of the elemental illumination of the scene, the exposure time and the aperture area. However, for any given adjustment of the exposure-control unit 21, the curve of Fig. 3 may be considered to represent variations of film density in terms of the logarithm of elemental area illumination. It is desirable in making an exposure to cause the range of illumination or exposure values to fall within the range B—C and preferably to cause the darkest portion of the scene to fall on the point D of this characteristic near but somewhat above the lower bend in the response characteristic, with the brightest portion of the scene falling on the point E. This corresponds for the medium shown to a brightness ratio of approximately 10:1. If the ratio of the brightest to the darkest areas of the scene is greater than or less than this value, the extreme brightness values will fall at other points on the curve. From a large amount of data obtained from the study of many aerial photographs, it has been determined that the brightness ratio seldom exceeds a value of 20:1. Therefore, if the brightness of the darkest portion only of the scene is measured and exposure settings are made which will cause this part of the scene to fall on the characteristic near the lower end of the substantially linear portion of the characteristic, as indicated at point D, it has been found in actual practice that the entire content of the scene will be exposed so that the total range of brightness falls within the portion D—F of the response characteristic.

It will be apparent that the apparatus described above is effective to practice applicants' improved method of controlling the exposure of a photosensitive medium having a substantially linear response characteristic over an extended range of exposures between the two limiting non-linear or curved portions which comprises examining elemental areas of the scene in sequence, by means of the scanning disc 10 and its associated photoelectric pick-up comprising elements 13, 14, and 15, and developing an effect representative of an extreme value, for example, the minimum value, of the illumination of the elemental areas by means of the electrical detector unit 19 and the suppressor pulse circuit 20. This effect is then utilized to control the exposure of the medium to cause the range of illuminations of the several elemental areas to fall primarily on the substantially linear portion of the response characteristic represented in Fig. 3. Specifically, the method is effective to cause the illumination of the elemental area of extreme brightness, such as the minimum brightness, to fall near one of the non-linear portions, specifically, the lower non-linear portion of the response characteristic of Fig. 3.

Figure 6:
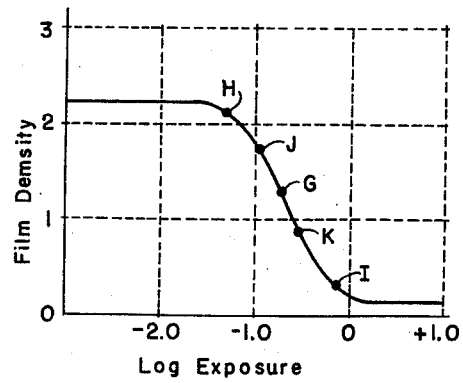
Fig. 6 is a graph representing the response characteristic of a photosensitive material of the reversal type.

In some aerial photographic operations, particularly those using reversal photosensitive materials rather than negative photosensitive materials, best results may be obtained when the lightest and darkest portions of the scene are exposed so as to be located at points equidistant from the mid-point of the substantially linear portion of the response characteristic, plotted on a logarithmic scale. Fig. 6 represents a typical response characteristic for such a reversal photosensitive material in which the exposure is plotted on a logarithmic scale. In this figure, the point G represents the midpoint of the substantially linear portion of the characteristic extending between points H and I. For scenes having a low brightness ratio, for example, 4:1, the maximum and minimum brightness levels would fall at the points J and K, respectively, while for a high contrast scene having a brightness ratio of the order of 10:1, the extreme brightness levels will fall on points H and I of the characteristic.

Figure 5:
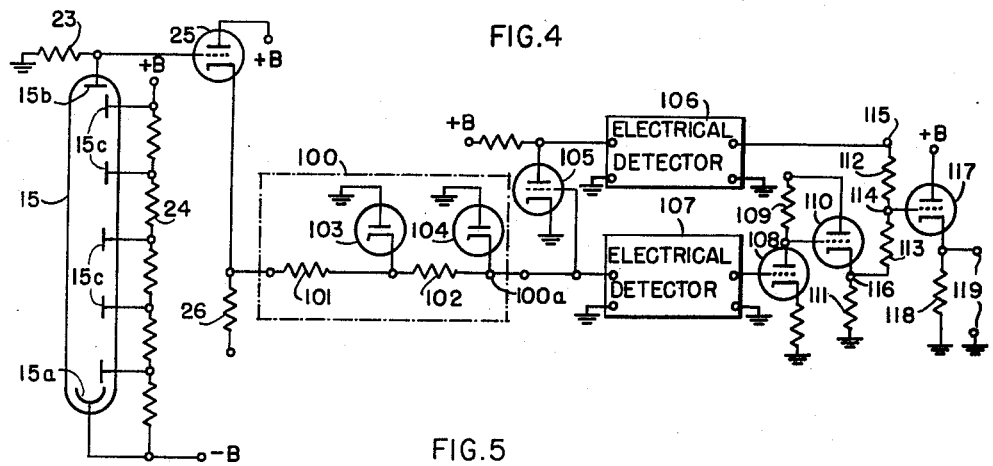

In order to effect this method of exposure control, it is desirable to develop a signal of a value proportional to the mean value of the maximum and minimum brightnesses of the scene on a logarithmic scale. A system for obtaining this result is represented in Fig. 5 in which elements corresponding to those of Fig. 2 are represented by corresponding reference numerals. In this case, the signal developed across the resistor 26, which is representative of the variations in brightness of the successive elemental areas as they are scanned, is impressed upon a circuit 100 for deriving a signal representative of the logarithm of the signal across the resistor 26 over a scanning period. This circuit 100 comprises a pair of series resistors 101, 102 and shunt diodes 103, 104 connected in a manner similar to that of a conventional ladder filter. The values of resistors 101, 102 are very high in relation to the operating voltages of diodes 103, 104, respectively, so that they operate at all times near the origin of their anode voltage-space current characteristic which, as is well known, is approximately logarithmic in this region. Hence, the output signal of the unit 100 appearing at the terminal 100a is approximately representative of the input signal of the unit and is applied to two parallel signal-translating channels. The first channel includes a conventional vacuum-tube amplifier 105, which is effective to reverse the polarity of the signal applied thereto, coupled to a first electrical detector 106. The output signal of unit 100 is also applied to a second channel including electrical detector 107. Each of the units 106 and 107 may comprise a unit such as the electrical detector unit 19 and the suppressor pulse circuit 20 of Fig. 2 and the photocell 18 and its associated elements for developing a periodic pulse signal. As in the circuit of Fig. 2, the electrical detector 106 is effective to develop a signal representative of the maximum (most positive) value of the signal applied thereto by the amplifier 105 which, because of the reversal of the polarity of the signal in this amplifier, is representative of the minimum (least positive) value of the logarithm of the signal applied to the circuit 100. Similarly, the electrical detector circuit 107 is effective to derive a signal representative of the logarithm of the maximum (most positive) value of the signal applied to the circuit 100.

The exposure control apparatus of Fig. 5 also comprises a circuit responsive jointly to such maximum value and minimum value signals for deriving a signal of intermediate value, specifically, of a value equal to the mean value of these two signals. This circuit comprises a vacuum-tube amplifier 108 coupled to the output circuit of the unit 107 and provided with a load resistor 109 across which is developed a signal which is an inversion of the signal supplied by the unit 107. The signal output of the amplifier 108 is applied to the control electrode of a vacuum-tube amplifier 110 having a load resistor 111 and connected as a cathode follower. The signal output of amplifier 110 across resistor 111 is of the same polarity as its input signal and this signal and that of the unit 106 are then averaged by voltage division through a voltage divider comprising resistors 112, 113, and 111 of such relative values as to develop at point 114 a voltage which is the mean of the voltages at points 115 and 116. The signal at point 114 is applied to the control electrode of a cathode-follower amplifier 117 which develops across its load resistor 118 a signal which is the average of the signals developed at the output of detector 106 and the output circuit of the amplifier 108. This signal is applied to the output circuit including terminals 119 which is thus responsive to the intermediate or mean value of the signal outputs of the electrical detector 106 and the amplifier 108.

Thus, in the apparatus of Fig. 5 there is developed at the output terminal 100a a signal representative of the logarithm of the signal developed by the scanning device. This signal is applied to the electrical detector 107 and the phase-reversing amplifier 108 which develops at its output circuit a signal which is the inverse of the signal representative of the logarithm of the maximum (most positive) values of the signal developed by the scanning device but of reversed polarity. At the same time, the signal output of the circuit 100, reversed in polarity in the amplifier 105 and applied to the electrical detector unit 106, is converted therein to a signal representative of the logarithm of the minimum (least positive) value of the signal developed by the scanning device. These two signals are then averaged by voltage division in the voltage divider 112, 113, 111 to develop at point 114 a signal representative of the logarithm of the mean value of the signals representative of minimum and maximum brightnesses on a logarithmic scale. This signal is then applied to a unit, such as unit 21 of Fig. 1, to control the exposure of the camera in such a way as to cause such mean value of elemental area illumination to fall substantially at the center of the linear portion of the response characteristic of the photosensitive medium on a logarithmic scale, that is, at the point G of Fig. 6. Under these conditions, the greatest brightness range of scenes to be photographed will fall on the substantially linear portion of the response characteristic represented in Fig. 6. For all brightness ranges usually encountered, the extremes of brightness level will fall well within this linear range and within the extreme non-linear portions of the characteristic. For scenes of high contrast, for example, a brightness ratio of as much as 20:1, only the very extremes of brightness levels will be appreciably compressed in the photographic negative.

In the case of some photosensitive materials, it has been found that the maximum resolving power is obtained at a particular point on the response characteristic of the medium and that the resolving power diminishes more rapidly when the exposure is less than the optimum value than when it is greater. In such cases, the optimum exposure for any scene can be obtained with the apparatus of Fig. 5 by the expedient of selecting unequal values for resistors 110 and 111. For example, if the resolution diminishes twice as fast for under-exposure as for over-exposure, the best results can be obtained by using a resistance value for resistor 110 which is twice that of resistor 111. This causes the mean value of illumination on a logarithmic scale to fall on the response characteristic at a point one-third of the distance between that representative of minimum brightness (point H) and that representative of maximum brightness (point I) and would result in the optimum exposure of the scene as a whole.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Exposure-control apparatus responsive to an extreme illumination value of a scene comprising: a continuously operable scanning device for repetitively examining elemental areas of the scene in a predetermined regular sequence; means disposed in the optical path of said scanning device for developing an electrical signal varying with the illumination of the elemental area of the scene under examination by said scanning device; an electrical detector selectively responsive to an extreme value of said signal over a scanning period; and an output circuit responsive to said detected signal.

2. Exposure-control apparatus responsive to an extreme illumination value of a scene comprising: a continuously rotatable Nipkow disc and an optical system for repetitively examining elemental areas of the scene in a predetermined regular sequence; means disposed in the optical path of said scanning device for developing an electrical signal varying with the illumination of the elemental area of the scene under examination by said Nipkow disc; an electrical detector selectively responsive to an extreme value of said signal over a scanning period; and an output circuit responsive to said detected signal.

3. Exposure-control apparatus responsive to an extreme illumination value of a scene comprising: a continuously operable scanning device for repetitively examining elemental areas of the scene in a predetermined regular sequence; a photoelectric device disposed in the optical path of said scanning device and continuously responsive to the illumination of the elemental area of the scene under examination by said scanning device for developing an electrical signal varying with such illumination; an electrical detector selectively responsive to an extreme value of said signal over a scanning period; and an output circuit responsive to said detected signal.

4. Exposure-control apparatus responsive to an extreme illumination value of a scene comprising: a continuously operable scanning device for repetitively examining elemental areas of the scene in a predetermined regular sequence; means disposed in the optical path of said scanning device for developing an electrical signal varying continuously with the illumination of the elemental area of the scene under examination by said scanning device; an electrical detector selectively responsive to an extreme value of said signal over a scanning period corresponding to the minimum elemental brightness of the scene; and an output circuit responsive to said detected signal.

5. Exposure-control apparatus responsive to an extreme illumination value of a scene comprising: a continuously operable scanning device for repetitively examining elemental areas of the scene in a predetermined regular sequence; means disposed in the optical path of said scanning device for developing an electrical signal varying with the illumination of the elemental area of the scene under examination by said scanning device; an electrical detector selectively responsive to an extreme value of said signal for deriving a signal representative of the logarithm of an extreme value thereof over a scanning period; and an output circuit responsive to said detected signal.

6. Exposure-control apparatus responsive to an extreme illumination value of a scene comprising: a continuously operable scanning device for repetitively examining elemental areas of the scene in a predetermined regular sequence; means disposed in the optical path of said scanning device for developing an electrical signal varying with the illumination of the elemental area of the scene under examination by said scanning device; an electrical detector selectively responsive to an extreme value of said signal over a scanning period and for storing said extreme value of said signal for a predetermined period; and an output circuit responsive to said stored signal.

7. Exposure-control apparatus responsive to an extreme illumination value of a scene comprising: a continuously operable scanning device for repetitively examining elemental areas of the scene in a predetermined regular sequence; means disposed in the optical path of said scanning device for developing an electrical signal varying continuously with the illumination of the elemental area of the scene under examination by said scanning device; an electrical detector selectively responsive to an extreme valve of said signal over a scanning period and for storing said extreme value of said signal for a predetermined period; means for periodically suppressing said stored signal; and an output circuit responsive to said stored signal.

8. Exposure-control apparatus responsive to an extreme illumination value of a scene comprising: a scanning device for examining elemental areas of the scene in sequence; means for developing an electrical signal varying continuously with the illumination of the elemental area of the scene under examination by said scanning device; an electrical detector responsive to said signal for detecting an extreme value thereof over a scanning period and for storing said extreme value of said signal for a predetermined period; a second signal-storage circuit; means for transferring said stored signal to said storage circuit; means for intermittently suppressing said transferred signal and thereafter suppressing said stored signal; and an output circuit responsive to said transferred signal.

9. Exposure-control apparatus responsive to an extreme illumination value of a scene comprising: a scanning device for examining elemental areas of the scene in sequence; means for developing an electrical signal varying continuously with the illumination of the elemental area of the scene under examination by said scanning device; a signal-storage device; means for charging said device to a reference-signal value; a circuit including a directionally conductive device for applying said developed signal to said device to discharge the same to the minimum signal value occurring during a scanning period; and an output circuit responsive to said minimum value signal.

10. Exposure-control apparatus responsive to an extreme illumination value of a scene comprising: a scanning device for examining elemental areas of the scene in sequence; means for developing an electrical signal varying continuously with the illumination of the elemental area of the scene under examination by said scanning device; a signal-storage device; a circuit for charging said signal-storage device to a reference-signal value; a circuit including a directionally conductive device for applying said developed signal to said device to discharge the same to the minimum signal value occurring during a scanning period; a second signal-storage device; means for transferring said minimum value signal to said second signal-storage device; means for intermittently suppressing said transferred signal and thereafter energizing said charging circuit to recharge said first signal-storage device to said reference-signal value; and an output circuit responsive to said transferred signal.

11. Exposure-control apparatus responsive to an extreme illumination value of a scene comprising: a scanning device for examining elemental areas of the scene in sequence; means for developing an electrical signal varying continuously with the illumination of the elemental area of the scene under examination by said scanning device; a signal-storage device; a circuit for charging said signal-storage device to a reference-signal value; a circuit including a directionally conductive device for applying said developed signal to said device to discharge the same to the minimum signal value occurring during a scanning period; a second signal-storage device; a second circuit including a directionally conductive device for transferring said minimum value signal to said second signal-storage device; means for intermittently suppressing said transferred signal and thereafter energizing said charging circuit to recharge said first signal-storage device to said reference-signal value; and an output circuit responsive to said transferred signal.

12. Exposure-control apparatus responsive to an extreme illumination value of a scene comprising: a scanning device for examining elemental areas of the scene in sequence; means for developing an electrical signal varying continuously with the illumination of the elemental area of the scene under examination by said scanning device; a signal-storage device; a circuit for charging said signal-storage device to a reference-signal value; a circuit including a directionally conductive device for applying said developed signal to said device to discharge the same to the minimum signal value occurring during a scanning period; a second signal-storage device; a second circuit for charging said second signal-storage device to substantially said reference-signal value; means for applying said minimum value signal to said second signal-storage device to discharge the same substantially to said minimum signal value; means for intermittently energizing said second charging circuit to recharge said second signal-storage device substantially to said reference-signal value and thereafter energizing said first charging circuit to recharge said first signal-storage device to said reference-signal value; and an output circuit responsive to said transferred signal.

13. Exposure-control apparatus responsive to an extreme illumination value of a scene comprising: a scanning device for examining elemental areas of the scene in sequence; means for developing an electrical signal varying continuously with the illumination of the elemental area of the scene under examination by said scanning device; an electrical detector responsive to said signal for detecting an extreme value thereof over a scanning period and for storing said extreme value of said signal for a predetermined period; a second signal-storage circuit; means for transferring said stored signal to said storage circuit; means for periodically developing pairs of closely spaced electrical pulses; means for utilizing said pulses for periodically suppressing said transferred signal and thereafter suppressing said stored signal; and an output circuit responsive to said transferred signal.

14. Exposure-control apparatus responsive to an extreme illumination value of a scene comprising: a scanning device for examining elemental areas of the scene in sequence; means for developing an electrical signal varying continuously with the illumination of the elemental area of the scene under examination by said scanning device; an electrical detector responsive to said signal for detecting an extreme value thereof over a scanning period and for storing said extreme value of said signal for a predetermined period; a second signal-storage circuit; means for transferring said stored signal to said storage circuit; means operating synchronously with said scanning device for periodically developing pairs of closely spaced electrical pulses; means for utilizing said pulses for periodically suppressing said transferred signal and thereafter suppressing said stored signal; and an output circuit responsive to said transferred signal.

15. Exposure-control apparatus responsive to an extreme illumination value of a scene comprising: a Nipkow disc including a series of scanning holes and an auxiliary pulse-developing hole and an optical system associated therewith for examining elemental areas of the scene in sequence; a photoelectric device co-operating with said Nipkow disc for developing an electrical signal varying continuously with the illumination of the elemental area of the scene under examination by said scanning device; an electrical detector responsive to said signal for detecting an extreme value thereof over a scanning period and means for storing said extreme value of said signal for a predetermined period; a second signal-storage circuit; means for transferring said stored signal to said storage circuit; means including a second photoelectric device co-operating with said auxiliary hole of said Nipkow disc for periodically developing pairs of closely spaced electrical pulses; means for utilizing said pulses for periodically suppressing said transferred signal and thereafter suppressing said stored signal; and an output circuit responsive to said transferred signal.

16. Exposure-control apparatus responsive to extreme illumination values of a scene comprising: a scanning device for examining elemental areas of the scene in sequence; means for developing an electrical signal varying continuously with the illumination of the elemental area of the scene under examination by said scanning device; an electrical detector responsive to said signal for detecing a maximum value thereof over a scanning period and for storing said maximum value of said signal for a predetermined period; a second electrical detector responsive to said signal for detecting a minimum value thereof over a scanning period and for storing said minimum value of said signal for a predetermined period; a circuit responsive jointly to said maximum value and minimum value signals for deriving a signal of an intermediate value; and an output circuit responsive to said intermediate value signal.

17. Exposure-control apparatus responsive to extreme illumination values of a scene comprising: a scanning device for examining elemental areas of the scene in sequence; means for developing an electrical signal varying continuously with the illumination of the elemental area of the scene under examination by said scanning device; an electrical detector responsive to said signal for deriving a signal representative of the logarithm of the maximum value thereof over a scanning period and means for storing said maximum derived signal for a predetermined period; a second electrical detector responsive to said signal for deriving a signal representative of the logarithm of the minimum value thereof over a scanning period and for storing said minimum derived signal for a predetermined period; a circuit responsive jointly to said maximum value and minimum value signals for deriving a signal having a value equal to the mean value thereof; and an output circuit responsive to said mean value signal.

References Cited in the file of this patent

UNITED STATES PATENTS

| | | |
|---|---|---|
| 1,182,485 | Hood | May 9, 1916 |
| 2,183,217 | Goldsmith | Dec. 12, 1939 |
| 2,376,645 | Wolff | May 22, 1945 |
| 2,386,320 | Kott | Oct. 9, 1945 |
| 2,411,486 | Weisglass | Nov. 19, 1946 |
| 2,417,023 | Sweet | Mar. 4, 1947 |
| 2,467,057 | Simmon | Apr. 12, 1949 |
| 2,480,422 | Simmon et al. | Aug. 30, 1949 |
| 2,495,779 | Siefert | Jan. 31, 1950 |
| 2,499,039 | Simmon | Feb. 28, 1950 |
| 2,614,227 | Bordewieck et al. | Oct. 14, 1952 |
| 2,632,040 | Rabinow | Mar. 17, 1953 |
| 2,640,875 | Devaux | June 2, 1953 |
| 2,764,060 | Horak | Sept. 25, 1956 |

FOREIGN PATENTS

| | | |
|---|---|---|
| 631,937 | Great Britain | Nov. 14, 1949 |

OTHER REFERENCES

"Photographic Engineering," vol. 3, No. 1 (1952), pp. 1–11.

"American Cinematographer," vol. No. 34, issue No. 2, pp. 68 and 84–86 relied on, published February, 1953.